US006936097B2

(12) United States Patent
Shakhnovich

(10) Patent No.: US 6,936,097 B2
(45) Date of Patent: Aug. 30, 2005

(54) MODIFIED ORGANIC COLORANTS AND DISPERSIONS, AND METHODS FOR THEIR PREPARATION

(75) Inventor: Alex I. Shakhnovich, Westford, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 10/414,585

(22) Filed: Apr. 16, 2003

(65) Prior Publication Data

US 2004/0206275 A1 Oct. 21, 2004

(51) Int. Cl.⁷ .................. C09B 67/04; C09B 67/10; C09D 11/00
(52) U.S. Cl. .................. 106/493; 106/410; 106/412; 106/494; 106/495; 106/496; 106/497; 106/498; 106/499; 106/31.6
(58) Field of Search .................. 106/410, 412, 106/493, 494, 495, 496, 497, 498, 499, 31.6

(56) References Cited

U.S. PATENT DOCUMENTS

| | | | |
|---|---|---|---|
| 3,479,300 A | 11/1969 | Rivin et al. .................. 252/430 |
| 4,013,481 A | 3/1977 | Molls et al. .................. 106/309 |
| 4,014,844 A | 3/1977 | Vidal et al. .................. 260/31.2 R |
| 4,264,488 A | 4/1981 | Guenthert et al. .................. 260/42.21 |
| 4,946,509 A | 8/1990 | Schwartz et al. .................. 106/496 |
| 5,281,261 A | 1/1994 | Lin .................. 106/20 R |
| 5,418,277 A | 5/1995 | Ma et al. .................. 524/520 |
| 5,545,504 A | 8/1996 | Keoshkerian et al. .................. 430/137 |
| 5,554,739 A | 9/1996 | Belmont .................. 534/885 |
| 5,571,311 A | 11/1996 | Belmont .................. 106/20 R |
| 5,630,868 A | 5/1997 | Belmont et al. .................. 106/31.75 |
| 5,672,198 A | 9/1997 | Belmont .................. 106/20 R |
| 5,698,016 A | 12/1997 | Adams et al. .................. 106/316 |
| 5,707,432 A | 1/1998 | Adams et al. .................. 106/31.6 |
| 5,713,988 A | 2/1998 | Belmont et al. .................. 106/31.6 |
| 5,714,993 A | 2/1998 | Keoshkerian et al. .................. 347/95 |
| 5,803,959 A | 9/1998 | Johnson et al. .................. 106/31.75 |
| 5,837,045 A | 11/1998 | Johnson et al. .................. 106/31.85 |
| 5,851,280 A * | 12/1998 | Belmont et al. .................. 106/472 |
| 5,885,335 A | 3/1999 | Adams et al. .................. 106/316 |
| 5,895,522 A | 4/1999 | Belmont et al. .................. 106/31.6 |
| 5,900,029 A | 5/1999 | Belmont et al. .................. 8/550 |
| 5,914,806 A | 6/1999 | Gordon II et al. .................. 359/296 |
| 5,922,118 A | 7/1999 | Johnson et al. .................. 106/31.6 |
| 5,952,429 A | 9/1999 | Ikeda et al. .................. 525/326.1 |
| 5,964,935 A | 10/1999 | Chen et al. .................. 106/401 |
| 5,968,243 A | 10/1999 | Belmont et al. .................. 106/31.65 |
| 5,976,233 A | 11/1999 | Osumi et al. .................. 106/31.75 |
| 6,042,643 A | 3/2000 | Belmont et al. .................. 106/472 |
| 6,068,688 A | 5/2000 | Whitehouse et al. .................. 106/31.65 |
| 6,103,380 A | 8/2000 | Devonport .................. 428/403 |
| 6,110,994 A | 8/2000 | Cooke et al. .................. 523/215 |
| 6,136,087 A * | 10/2000 | Kapoor .................. 106/496 |
| 6,150,433 A | 11/2000 | Tsang et al. .................. 523/160 |
| 6,221,143 B1 | 4/2001 | Palumbo .................. 106/31.6 |
| 6,221,932 B1 | 4/2001 | Moffatt et al. .................. 523/160 |
| 6,235,829 B1 | 5/2001 | Kwan .................. 524/495 |
| 6,281,267 B2 | 8/2001 | Parazak .................. 523/160 |
| 6,328,894 B1 | 12/2001 | Chan et al. .................. 210/638 |
| 6,336,965 B1 | 1/2002 | Johnson et al. .................. 106/31.6 |
| 6,350,519 B1 | 2/2002 | Devonport .................. 428/403 |
| 6,372,820 B1 | 4/2002 | Devonport .................. 523/215 |
| 6,398,858 B1 * | 6/2002 | Yu et al. .................. 106/31.64 |
| 6,402,825 B1 | 6/2002 | Sun .................. 106/473 |
| 6,432,194 B2 | 8/2002 | Johnson et al. .................. 106/499 |
| 6,451,103 B1 * | 9/2002 | Uemura et al. .................. 106/493 |
| 6,458,458 B1 | 10/2002 | Cooke et al. .................. 428/407 |
| 6,472,471 B2 | 10/2002 | Cooke et al. .................. 525/165 |
| 6,478,863 B2 | 11/2002 | Johnson et al. .................. 106/31.6 |
| 6,494,943 B1 | 12/2002 | Yu et al. .................. 106/31.65 |
| 6,494,946 B1 | 12/2002 | Belmont et al. .................. 106/472 |
| 6,506,245 B1 | 1/2003 | Kinney et al. .................. 106/493 |
| 6,602,335 B2 | 8/2003 | Moffatt et al. .................. 106/31.8 |
| 6,641,653 B2 | 11/2003 | Yu .................. 106/31.6 |
| 6,641,656 B2 | 11/2003 | Yu et al. .................. 106/493 |

(Continued)

FOREIGN PATENT DOCUMENTS

| | | | |
|---|---|---|---|
| EP | 0 677 556 A2 | 10/1995 | .......... C09B/67/08 |
| EP | 0 688 836 A2 | 12/1995 | .......... C09D/11/02 |
| EP | 0 839 883 A2 | 5/1998 | .......... C09D/11/00 |
| GB | 1 168 523 | 10/1969 | .......... C09B/67/00 |
| GB | 2 330 842 | 5/1999 | .......... C09B/67/54 |
| GB | 2356634 A * | 5/2001 | |
| GB | 2 356 634 | 5/2001 | .......... C09B/29/33 |
| GB | 2356866 A * | 6/2001 | |
| GB | 2 356 866 | 6/2001 | .......... C09B/33/04 |
| GB | 2364322 A * | 1/2002 | |
| GB | 2 364 322 | 1/2002 | .......... C09B/29/33 |
| JP | 6-128517 | 5/1994 | .......... C09D/11/02 |
| WO | WO00/26304 | 5/2000 | .......... C09B/67/22 |
| WO | WO01/25340 | 4/2001 | .......... C09B/67/20 |
| WO | WO02/94944 | 11/2002 | .......... C09B/67/00 |

OTHER PUBLICATIONS

International Search Report and Written Opinion for PCT/US2004/011191, mailed Aug. 20, 2004.
JP11246806 A to Toyo Ink Mfg. Co. Ltd. Publication Date Sep. 14, 1999 Abstract Only (from Patent Abstracts of Japan).
JP11080636 A to Canon Inc., Publication Date Mar. 26, 1999 Abstract Only (from Patent Abstracts of Japan).
JP11256066 A to Tokai Carbon Co. Ltd., Publication Date Sep. 21, 1999 Abstract Only (from Patent Abstracts of Japan).

Primary Examiner—Anthony J. Green

(57) ABSTRACT

The present invention relates to methods of preparing modified organic colorant dispersions comprising the step of combining, in any order, i) an organic colorant; ii) an hydroxide reagent; and iii) an aqueous medium, to form a modified organic colorant dispersion. The methods further comprises a particle size reduction step. These steps can occur in either order. The organic colorant comprises at least one organic species having at least one ester group. Modified organic colorants and inkjet ink compositions are also disclosed.

34 Claims, No Drawings

U.S. PATENT DOCUMENTS

| | | |
|---|---|---|
| 6,648,954 B2 | 11/2003 | Uemura et al. .......... 106/31.85 |
| 6,664,312 B2 | 12/2003 | Devonport .................. 523/205 |
| 6,699,319 B2 * | 3/2004 | Adams et al. .............. 106/476 |
| 6,723,783 B2 | 4/2004 | Palumbo et al. ............ 524/555 |
| 6,740,151 B2 | 5/2004 | Belmont et al. ........... 106/31.6 |
| 2001/0003263 A1 | 6/2001 | Johnson et al. ............. 106/413 |
| 2001/0036994 A1 | 11/2001 | Bergemann et al. ........ 524/495 |
| 2002/0005146 A1 * | 1/2002 | Palumbo et al. ............ 106/476 |
| 2002/0147252 A1 | 10/2002 | Adams ....................... 523/161 |
| 2003/0195291 A1 | 10/2003 | Lamprey et al. ............ 524/495 |
| 2003/0213410 A1 | 11/2003 | Adams et al. .............. 106/499 |
| 2003/0217672 A1 | 11/2003 | Palumbo ..................... 106/473 |
| 2004/0007152 A1 | 1/2004 | Palumbo .................... 106/31.6 |
| 2004/0007161 A1 | 1/2004 | Belmont et al. ............ 106/499 |
| 2004/0103822 A1 | 6/2004 | Champlin et al. .......... 106/473 |
| 2004/0163569 A1 | 8/2004 | Shakhnovich .............. 106/31.8 |
| 2004/0206269 A1 | 10/2004 | Yu ............................. 106/31.6 |

* cited by examiner

MODIFIED ORGANIC COLORANTS AND DISPERSIONS, AND METHODS FOR THEIR PREPARATION

BACKGROUND OF THE INVENTION

1. Field of the Invention

The present invention relates to methods of preparing modified organic colorants and dispersions thereof. Modified organic colorants and inkjet ink compositions are also disclosed.

2. Description of the Related Art

In general, pigments alone are not readily dispersible in liquid vehicles. A variety of techniques have been developed which can provide stable pigment dispersions. For example, dispersants can be added to the pigment to improve its dispersibility in a particular medium. Examples of dispersants for an aqueous medium include water-soluble polymers and surfactants. In addition, water soluble pigment derivatives substituted with an acidic functional group or salt, such as those described in U.S. Pat. No. 6,451,103, have also been used to prepare aqueous dispersions of pigments.

Colored pigment dispersions have been prepared using dispersants having a structural unit similar if not identical to the chemical unit of the colored pigment. For example, GB2356866 discloses a bis-azo compound derived from diazotized (carboxy/sulfo)-anilines and 1,4-bis (acetoacetamido)phenylenes and their use in pigment and ink compositions. These materials were found to be particularly useful in combination with yellow or orange pigments having nearly the identical structure. GB2356634 describes very similar mono-azo compounds for the same use. GB2364322 describes N-(sulfophenyl)-alpha-(2-methoxy-4-nitrophenylazo) acetacetamides for use with monoazo pigments, particularly yellow pigments.

Other methods of controlling the dispersibility of colored pigments are also known. For example, International Patent Application No. WO00/26304 discloses the preparation of a crystal growth inhibitor that controls the amount of crystallinity developed during the process of preparing a colored pigment and prevents recrystallization of dispersed pigments. The crystal growth inhibitor is prepared using a process similar to the known process for preparing the pigment (for example, by the reaction of a diazonium salt with an azo coupling agent), and can also be prepared in situ during the preparation of the colored pigment.

Modified colored pigments have also been developed which provide ink compositions with improved properties, such as dispersibility. For example, U.S. Pat. No. 5,851,280 discloses methods for the attachment of organic groups onto pigments including, for example, attachment via a diazonium reaction wherein the organic group is part of the diazonium salt. The resulting surface-modified pigments can be used in a variety of applications, such as inks, inkjet inks, coatings, toners, plastics, rubbers, and the like.

PCT International Publication No. WO 01/51566 describes a method of making a modified pigment by reacting a first chemical group and a second chemical group to form a pigment having attached a third chemical group. The first chemical group includes at least one nucleophile and the second chemical group includes at least one electrophile, or vice versa. These pigments are used in ink compositions and, in particular, inkjet ink compositions.

While these efforts provide modified pigments with desirable overall properties, there remains a need for improved modified organic colorants and dispersions, as well as improved methods for preparing modified organic colorants, in order to meet the ever demanding needs of the colorant markets.

SUMMARY OF THE INVENTION

The present invention relates to a method of preparing a modified organic colorant dispersion comprising the steps of: combining, in any order, i) an organic colorant; ii) an hydroxide reagent; and iii) an aqueous medium, to form a modified organic colorant dispersion; and reducing the particle size of the modified organic colorant in the dispersion to a particle size of less than or equal to 350 nm. The organic colorant comprises at least one organic species having at least one ester group. These steps can occur in any order. Therefore, in another embodiment, the present invention relates to a method of preparing a modified organic colorant dispersion comprising the step of reducing the particle size of an organic colorant as described above to a particle size of less than or equal to 500 nm; and combining such size-reduced organic colorant, in any order, with i) an hydroxide reagent and ii) an aqueous medium, to form a modified organic colorant dispersion.

The present invention further relates to a modified organic colorant comprising the reaction product of a) an organic colorant comprising at least one organic species having at least one ester group and b) an hydroxide reagent. The modified organic colorant may comprise i) at least one organic species having at least one salt of a carboxylic acid group and ii) at least one organic species having at least one ester group. In one embodiment, in which the organic colorant comprises at least one organic species having at least two ester groups, the modified organic colorant comprises i) at least one organic species having at least one salt of a carboxylic acid group, ii) at least one organic species having at least two ester groups, and iii) at least one organic species having at least one ester group and a least one salt of a carboxylic acid group. Preferably the organic species having at least one salt of a carboxylic acid group is at the surface of the modified organic colorant.

The present invention further relates to an inkjet ink composition comprising a) a liquid vehicle and b) the modified organic colorant described herein. Preferably the liquid vehicle is an aqueous vehicle, and the resulting inkjet ink composition is an aqueous inkjet ink composition.

DETAILED DESCRIPTION OF THE INVENTION

The present invention relates to methods of preparing modified organic colorant dispersions. Modified organic colorants, in dispersion and dry form, and inkjet ink compositions are also disclosed.

In one embodiment, the method of the present invention comprises the step of combining an organic colorant comprising at least one organic species having at least one ester group, an hydroxide reagent, and an aqueous medium to form a modified organic colorant dispersion and a particle size reduction step. Each of these components will be described in more detail below. The steps can occur in any order, but preferably the step of combining the components is followed by the particle size reduction step. The organic colorant, hydroxide reagent, and aqueous medium can be combined in any order. However, it is preferred that either the organic colorant or hydroxide reagent be combined with the aqueous medium prior to the addition of the other component. Thus, the organic colorant may be added to the hydroxide reagent, which has already been combined with the aqueous medium, or, alternatively, the hydroxide reagent may be added to the organic colorant, which has already been combined with the aqueous medium. In addition, it may be desirable to combine the organic colorant and hydroxide reagents together after both have been combined with the aqueous medium.

The step of combining the components may take place in any suitable vessel, and the components may be added to the vessel either in several increments, in one single increment, or continuously. In a preferred embodiment of the method of the present invention, the organic colorant, hydroxide reagent, and aqueous medium are combined in equipment capable of providing high shear mixing conditions. Such equipment is known in the art and includes, for example, equipment capable of providing a grinding, impact, or similar impingement action, such as horizontal media mills, vertical media mills such as attritors, ball mills, hammer mills, pin disk mills, fluid energy mills, jet mills, fluid jet mills, impingement jet mills, rotor-stators, pelletizers, homogenizers, sonicators, cavitators, and the like. Thus, for the purposes of this preferred embodiment, "high shear mixing conditions," when referring to the step of combining the components, means mixing conditions having sufficient energy to produce an intimate mixture of the components. High shear mixing is particularly preferred when one of the components is insoluble in the aqueous medium, such as when the organic colorant is a colored pigment. The high shear mixers may be either batch, semi-continuous, or continuous mixers. A continuous mixer offers both economic and practical advantages to batch processing equipment and would be generally preferred.

The step of combining the components can occur at any temperature and for any time sufficient to produce a modified organic colorant dispersion. The temperature and time will depend on a variety of factors, including, for example, the type of organic colorant, the relative amounts of each component, and their concentrations. Typically, the components are combined at a temperature ranging from about 0° C. and 90° C. Preferably the temperature is from about 0° C. and 70° C., and most preferably from about 10° C. and 50° C. The temperature may be controlled by any method known in the art. In addition, when high shear mixing conditions are used, the temperature may be produced and/or maintained by the shearing. The time period is typically between 5 minutes and 48 hours, and is preferably between 30 minutes and 24 hours, most preferably between 1 hour and 12 hours.

As described above, the method of the present invention comprises a step of combining components and a particle size reduction step, and these steps can occur in either order. Thus, in one embodiment, the method of the present invention comprises the step of reducing the particle size of an organic colorant and then combining this size-reduced organic colorant with the components described herein. A further size reduction step may also be employed. In another embodiment, the method of the present invention comprises the steps of combining the components described herein to form a modified organic colorant in dispersion, and then subjecting the dispersion to a particle size reduction step, whereby the modified organic colorant is size-reduced. Therefore, the dispersion subjected to particle size reduction comprises at least one insoluble or only slightly soluble component. This may be, for example, the organic colorant used in the method or the modified organic colorant produced by the method. Other possibilities also exist and will be known to one skilled in the art.

The step of reducing the particle size may occur either in a separate vessel as the step of combining the components or alternatively may occur in the same vessel. As stated previously, this step preferably follows the step of combining the components. In addition, these two steps may occur simultaneously. Any equipment known in the art for reducing particle size may be used here, including the high shear mixing equipment described above. A particularly preferred technique for reducing particle size is sonication.

The particle size of the organic colorant or the modified organic colorant prior to the particle size reduction step is not generally limiting but is typically approximately 500 nm. After the step of particle size reduction, the modified organic colorant dispersion will have a resulting particle size allowing it to be stable in the dispersion medium. Typically, the particle size of the colorant will be less than or equal to 350 nm. Preferably, the particle size will be less than or equal to 300 nm, more preferably less than or equal to 250, and most preferably less than or equal to 200 nm.

The method may further comprise a drying step. Any equipment known to one skilled in the art useful for drying colorant dispersions can also be used here. This results in a modified organic colorant in a dry form, such as a powder, pellet, granule, or cake.

The organic colorant used in the method of the present invention may be any colorant known to one skilled in the art. As discussed above, it is preferred that the organic colorant be insoluble in the aqueous medium. Thus, preferably the organic colorant is either a colored pigment or a disperse dye (which is soluble in a solvent but is water insoluble). Most preferred are colored pigments. Since the organic colorant used in the method of the present invention is an organic material which comprises at least one organic species having specified functional groups, pigments such as titanium dioxide and silica (which are inorganic colorants) as well as carbon black and other carbonaceous materials (which, like inorganic colorants, are not comprised of organic species as defined herein), are not typically suitable as the organic colorant for the present invention.

The organic colorant may be chosen from a wide range of conventional colored pigments or disperse dyes. The organic colorant can comprise a blue, black, brown, cyan, green, white, violet, magenta, red, orange, or yellow pigment, or mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio) indigoids. Such pigments are commercially available in either powder or press cake form from a number of sources including, BASF Corporation, Engelhard Corporation and Sun Chemical Corporation. Examples include Pigment Yellow 120, Pigment Yellow 155, Pigment Yellow 175, Pigment Yellow 213, Pigment Red 220, and Pigment Red 221. Other examples of suitable organic colorants are described in the Colour Index, 3rd edition (The Society of Dyers and Colourists, 1982).

The colored pigment or disperse dye used as the organic colorant can have a wide range of BET surface areas, as measured by nitrogen adsorption, and therefore, a wide range of particle sizes. It is preferred that such an organic colorant have a small particle size in order to prepare modified organic colorant dispersions having desirable overall properties, such as stability. If the preferred smaller particle size (and therefore higher surface area) organic colorant is not readily available, the organic colorant may be subjected to size comminution or reduction techniques to reduce the starting particle size of the colorant. For example, in a preliminary step, the organic colorant may be subjected to high shear mixing conditions, if necessary or desirable, prior to the step of combining the components. For this preliminary step, "high shear" refers to conditions sufficient to reduce the particle size of the organic colorant in the aqueous medium. Equipment described above for the step of combining the components may also be used in this preliminary step.

It is known in the art that insoluble organic colorants, such as colored pigments and disperse dyes, consist of insoluble organic species (often referred to as dye molecules) having defined chemical structures. The organic species often comprise a variety of functional groups. The chemical structure of the organic species and location of functional groups determines the color of the organic species as well as the pigment's or dye's chemical reactivity.

The organic colorant used in the method of the present invention comprises at least one organic species having at least one ester group. The ester group may be anywhere in the chemical structure of the organic species but is preferably a pendant functional group rather than an internal group. The organic species may further comprise a variety of additional functional groups, such as, for example, azo groups, amide groups, nitro groups, and the like.

The ester of the organic species may be any group having the general formula —COOR, wherein R is an aryl or alkyl group. Preferably, the ester is an alkyl ester, being derived from an alkyl alcohol having from 1 to 12 carbons. For example, the ester may be a methyl ester group or an ethyl ester group, such as a methyl benzoate or an ethyl benzoate.

An hydroxide reagent is also combined in the method of the present invention. An hydroxide reagent is any reagent that comprises an $OH^-$ ion, such as a salt having an hydroxide counterion. Examples include sodium hydroxide, potassium hydroxide, lithium hydroxide, and ammonium hydroxide. Other hydroxide salts, as well as mixtures of hydroxide reagents, can also be used. Furthermore, other alkaline reagents may also be used which generate $OH^-$ ions in an aqueous medium. Examples include carbonates such as sodium carbonate, bicarbonates such as sodium bicarbonate, and alkoxides such as sodium methoxide and sodium ethoxide.

The aqueous medium used in the method of the present invention can be any medium containing water. Thus, the aqueous medium can be, for example, water or mixtures of water with water miscible solvents such as alcohols. Preferably the aqueous vehicle is water. Other additives may also be present, such as for example, surfactants, stabilizers, phase transfer catalysts, and the like.

The amounts of each component may be varied in order to obtain a modified organic colorant dispersion. The amounts will depend on a variety of factors, including the type of organic colorant and the number of ester groups of the organic species. Typically, the ratio of organic colorant to aqueous medium is between about 1:1 to 1:100. Preferably the ratio is between about 1.1 to 1:20, more preferably 1:2 to 1:10, and most preferably 1:4 to 1:10.

The amount of hydroxide reagent can be calculated based on the total molar amount of ester groups, which is determined from the total weight of organic colorant used, the molecular weight of the organic species which comprises the organic colorant, and the number of ester groups per organic species. While any amount of hydroxide can be used, it is preferred that the amount be less than the total amount of ester groups in order to avoid the formation of soluble organic colorants or dyes. This is particularly true when the organic colorant comprises an organic species having more than one ester group. Thus, the amount of hydroxide should be less than about 20% based on the total molar amount of ester groups. Preferably, the amount of hydroxide reagent is less than about 15% and more preferably less than about 10% based on the total moles of ester groups.

The present invention further relates to a modified organic colorant comprising specific types of organic species. As used herein, the term "modified" refers to a chemical transformation or reaction of the organic colorant. Thus, the modified organic colorant of the present invention comprises the reaction product of an organic colorant and an hydroxide reagent. The organic colorant comprises at least one organic species having at least one ester group. The modified organic colorant may comprise i) at least one organic species having at least one salt of a carboxylic acid group and ii) at least one organic species having at least one ester group. The organic colorants can be any of those described above, and is preferably a colored pigment. The ester groups and hydroxide reagents can also be any of those described above. The salt of a carboxylic acid group can be any group having the general formula $COO^-M^+$, resulting from the reaction of any of the ester groups described above and a base having a metal counterion ($M^+$). Examples of counterions include those described for the hydroxide reagent above.

In a first embodiment, the modified organic colorant of the present invention comprises the reaction product of an organic colorant comprising at least one organic species having one ester group and an hydroxide reagent. For this first embodiment, the modified organic colorant comprises i) at least one organic species having one salt of a carboxylic acid group and ii) at least one organic species having one ester group.

The composition of the modified organic colorant of this first embodiment can be described as follows. If the amount of the organic species having one ester group of the organic colorant is represented by Z, and, for the modified organic colorant, the amount of the organic species having one ester group is represented by Y and the amount of organic species having one salt of a carboxylic acid group is represented by X, then the composition of the modified organic colorant of the present invention will satisfy the relationship: $X+Y=Z$.

The amount of each organic species can be varied to produce modified organic colorants having improved overall properties. For example, using the designations described above, X (the amount of organic species of the modified organic colorant having one carboxylic acid salt group) can be equal to Z (the amount of organic species having at least one ester of the organic colorant). Preferably, X is a value less than Z. For example, X may be less than 50% of Z, more preferably less than 10% of Z, and most preferably less than 2% of Z. Furthermore, it is preferred that X be less than Y. Thus, the modified organic colorants of the first embodiment of the present invention preferably comprise more organic species having one ester group than organic species having one salt of a carboxylic acid group. It is most preferred, in order to form a stable dispersion of this modified organic colorant, that the organic species having one salt of a carboxylic acid group be at or near the surface of the modified organic colorant.

In a second embodiment, the modified organic colorant of the present invention comprises the reaction product of an organic colorant comprising at least one organic species having at least two ester groups, and an hydroxide reagent. For this embodiment, the modified organic colorant comprises i) at least one organic species having at least one salt of a carboxylic acid group, ii) at least one organic species having at least two ester groups, and iii) at least one organic species having at least one ester group and a least one salt of a carboxylic acid group. The organic colorant, hydroxide reagent, and groups are as described above.

The composition of the modified organic colorant of this second preferred embodiment can be defined in a similar way as for the first preferred embodiment. Thus, for the organic colorant, if the amount of the organic species having at least two ester groups is represented by Z and, for the modified organic colorant, the amount of the organic species having at least two ester groups is represented by Y, the amount of organic species having at least one salt of a carboxylic acid group is represented by X, and the amount of organic species having at least one ester group and at least one salt of a carboxylic acid group is represented by A, then the modified organic colorant of the present invention will satisfy the relationship: $X+Y+A=Z$.

As for the first embodiment, the amount of each organic species can be varied to produce modified organic colorants having improved overall properties. For example, using the designations described above, $X+A$ (the amount of organic species of the modified organic colorant having carboxylic acid salt groups) can be equal to Z (the amount of organic species of the organic colorant having at least one ester group). Preferably, the value of $(X+A)$ is less than Z. For example, $(X+A)$ may be less than 50% of Z, more preferably less than 10% of Z, and most preferably less than 2% of Z. Furthermore, it is preferred that $(X+A)$ be less than Y. Thus, the modified organic colorant of the second embodiment of the present invention preferably comprises more organic species having ester groups than organic species having carboxylic acid salt groups. It is most preferred, in order to form a stable dispersion of this modified organic colorant, that the organic species having carboxylic acid salt groups be at or near the surface of the modified organic colorant.

For both embodiments, the modified organic colorants can be prepared by any method known in the art. In particular, the modified organic colorants of the present invention can be prepared using the method of the present invention as described above. Thus, when the method of the present invention is used, the relationship between the amounts of organic species having salts of carboxylic acid groups in the modified organic colorant and the organic species of the organic colorant can be viewed as a percent conversion. For example, for the first embodiment, $X=Z$ would be interpreted as 100% conversion, X is less than 50% of Z would mean less than 50% conversion, and so on. Likewise for the second embodiment, in which $(X+A)=Z$ would be 100% conversion (i.e., 100% of the organic species having at least two ester groups have been converted into an organic species having at least one salt of a carboxylic acid group), $(X+A)$ is less than 50% of Z would be less than 50% conversion, etc. The amounts of each organic species can be varied, for example, by varying the amount of hydroxide reagent, the reaction concentration, the type of organic colorant, and the reaction conditions (including reaction time, temperature, and, if used, amount of shear).

As discussed previously, prior art methods for preparing colored pigment dispersions have typically involved the formation of a dispersant which often have structural characteristics similar to the organic species that make up the colored pigment. Prior art dispersants are typically formed by combining a diazonium salt, prepared from an aromatic amine and a diazotizing agent, with an azo coupler. The dispersant is then added to the colored pigment to form the final dispersion. The colored pigment prepared in this way is, therefore, a coated pigment having a surface layer of dispersant.

In contrast to the modified organic colorants of the present invention, the colored pigments of the prior art would not satisfy the relationships described above for the modified organic colorants of the present invention. For known colored pigments, the amount of organic species having ester groups in the coated colored pigment is equal to the amount of organic species having ester groups in the original colored pigment. Thus, using the designations for either of the embodiments of the present invention, $Y=Z$. Therefore, $X+Y>Z$. In addition, the modified organic colorants of the second embodiment comprise at least one organic species having at least one ester group and at least one salt of a carboxylic acid group. Such an organic colorant having a mixture of groups cannot be produced using the methods known in the art. Furthermore, the organic colorants of the present invention could not be prepared using the methods known to one skilled in the art since the organic species having one salt of a carboxylic acid group is not prepared in the presence of the other organic species. In essence, the coated product of the art is not a modified organic colorant, as the term is used in the present invention, since no chemical modification has occurred.

Utilizing the method of the present invention, the modified organic colorant will be in dispersion form. As stated earlier, the dispersion may be subjected to drying to form a modified organic colorant. The modified organic colorants of the present invention, as well as the dispersions prepared by the method of the present invention, may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art.

The modified organic colorants and dispersions may also be purified or classified to remove impurities and other undesirable free species which can co-exist in the dispersion as a result of the manufacturing process. Known techniques of ultrafiltration/diafiltration using a membrane or ion exchange may be used to purify the dispersion and remove a substantial amount of free ionic and unwanted species. An optional exchange of counterions step may also occur in the purification process whereby the counterions that form a part of the modified pigment are exchanged or substituted with alternative counterions (including, e.g., amphiphilic ions) utilizing known ion exchange techniques such as ultrafiltration, reverse osmosis, ion exchange columns and the like. Particular examples of counterions that can be exchanged include, but are not limited to, $Na^+$, $K^+$, $Li^+$, $NH_4^+$, $Ca^{2+}$, and $Mg^{2+}$.

The modified organic colorants and dispersions of the present invention may be useful in a variety of applications, including, but not limited to inks, coatings, plastics, paper, textiles, and rubber products. In particular, the modified organic colorant dispersions have been found to be effective in inkjet ink compositions. Therefore, the present invention also relates to an inkjet ink composition comprising a) a liquid vehicle, b) a modified organic colorant.

In general, an inkjet ink composition consists of a vehicle, which functions as a carrier, and a colorant such as a dye or pigment. Additives and/or cosolvents can be incorporated in order to adjust the ink to attain the desired performance. Preferably, the liquid vehicle for the inkjet ink compositions of the present invention is an aqueous vehicle, and the inkjet ink composition is therefore an aqueous inkjet ink composition. The aqueous vehicle can be the same as described above in relation to the method of preparing the modified organic colorant dispersion.

The modified organic colorant used in the inkjet ink compositions of the present invention are the same as described above and are present in an amount effective to provide the desired image quality (for example, optical density) without detrimentally affecting the performance of the inkjet ink. For example, typically the modified organic colorant will be present in an amount ranging from about 0.1% to about 20% based on the weight of the ink. Mixtures of colorants may also be used. In addition, it is also within the bounds of the present invention to use a formulation containing a modified pigment product as described in, for example, U.S. Pat. Nos. 5,630,868, 5,803,959, 5,837,045, and 5,922,118, all incorporated in their entirety by reference.

The inkjet ink compositions of the present invention can be formed with a minimum of additional components (additives and/or cosolvents) and processing steps. However, suitable additives may also be incorporated into these inkjet ink compositions to impart a number of desired properties while maintaining the stability of the compositions. For example, surfactants may be added to further enhance the colloidal stability of the composition. Other additives are well known in the art and include humectants, biocides, binders, drying accelerators, penetrants, and the like. The amount of a particular additive will vary depending on a variety of factors but are generally present in an amount ranging between 0% and 40%.

Additionally, the inkjet ink compositions of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink compositions can be purified and/or classified using methods such as those described above for the colored pigment dispersions described above. In this way, unwanted impurities or undesirable large particles can be removed to produce an inkjet ink with good overall properties.

The present invention will be further clarified by the following examples which are intended to be only exemplary in nature.

EXAMPLES

Example 1

A rotor-stator high shear mixer (Silverson L4RT-A) was fitted with a 4 liter stainless steel beaker. The beaker was charged with 1,000 mL of DI water and 4.0 g of sodium hydroxide. After the dissolution of sodium hydroxide, approximately 50 g of Pigment Yellow 155 (InkJet Yellow 4G, manufactured by Clariant Corp.) was added in one portion. The pigment quickly wetted out, and the mixture was homogenized for 2 hours at 7,200 rpm. Due to shear heat evolution, the temperature of reaction mixture remained at 60 degrees C. The resulting modified organic colorant in the dispersion was found to have a median particle size of 350 nm.

The dispersion was then transferred to a Telsonic® flow-through sonicator and sonicated for 2 hours. The pH of the resulting modified yellow pigment dispersion was carefully adjusted to between 7.5 and 8.0 with 0.1 N hydrochloric acid. The dispersion was then diafiltered and concentrated to 10% solids using a 50 nm diafiltration membrane column. The median particle size of the bright yellow dispersion was approximately 170 nm. The modified yellow pigment dispersion was found to have a sodium content (measured using a ROSS ion selective sodium electrode, manufactured by Orion) of 2700 ppm (on a solid basis) at a pH of 8.1.

This example shows an embodiment of the method of the present invention in which the step of combining the components is done under high shear conditions and is followed by a particle size reduction step in which sonication is used. The resulting modified organic colorant is a yellow pigment comprising an organic species having at least one sodium salt of a carboxylic acid group, as shown by the level of sodium. This corresponds to approximately 2.2% conversion of the ester groups to carboxylic acid salt groups.

Example 2

A stainless steel beaker with a magnetic stir bar was mounted on a stirrer-hot plate, and was further fitted with a peristaltic pump and a flow-through sonication cell (Misonix 3000) so that a mixture added to the beaker could be heated, stirred and circulated through the sonication cell simultaneously. To this was added a mixture of 30 g of Pigment Yellow 155 (InkJet Yellow 4G, manufactured by Clariant Corp.) and 300 mL DI water. The mixture was circulated through the flow-through sonication cell. The heater was adjusted to 60 degrees C. After this, 60 mL of a 1 N solution of sodium hydroxide was added, and the mixture was circulated and sonicated for 3 hours. The resulting modified organic colorant dispersion was found to have a median particle size of 200 nm.

The pH of the yellow dispersion was carefully adjusted with 0.1N hydrochloric acid to pH 7.5–8.0. The dispersion was then diafiltered and concentrated to 10% solids using 50 nm diafiltration membrane column. The median particle size of the bright yellow dispersion was between 180–190 nm and was stable for several months at 70 degrees C. The modified yellow pigment dispersion was found to have a sodium content (measured using a ROSS ion selective sodium electrode, manufactured by Orion) of 2,500 ppm (on a solid basis) at a pH of 8.4.

This example shows an embodiment of the method of the present invention in which both the step of combining the components and the particle size reduction step are done simultaneously under high shear conditions, and sonication is used. The resulting modified organic colorant is a yellow pigment comprising an organic species having at least one sodium salt of a carboxylic acid group, as shown by the level of sodium. This corresponds to approximately 2.0% conversion of the ester groups to carboxylic acid salt groups.

Example 3

Inkjet ink compositions were formulated using the modified yellow pigment dispersions from Examples 1 and 2. Thus, 5 mL of each of the pigment dispersions were combined with 5 mL of an ink vehicle containing 37.6% of 2-pyrrolidone, 5.4% of pentane-1,5-diol, 6.0% of isopropanol, 0.1% of Surfynol® 465 and the balance of water. The inks were then filtered tlirough a 450 nm syringe filter into a Hewlett-Packard 2000C print head, and square patterns of yellow were printed using HP 2000C on HP Bright White Inkjet paper and on HP Premium Plus Photo paper. The resulting images for each ink had excellent visual print quality and maximal optical density at 400 nm equal to 1.2–1.3.

Example 4

The procedure followed in Example 2 was followed, with the exception that only 30 mL of 1 N sodium hydroxide solution was used. The median particle size of the resulting bright yellow dispersion was between 180–190 nm and was stable for several weeks at 70 degrees C. The modified yellow pigment dispersion was found to have a sodium content (measured using a ROSS ion selective sodium electrode, manufactured by Orion) of 1,700 ppm (on a solid basis) at a pH of 8.0.

This example shows that the sodium content, and therefore the amount of organic species having at least one salt of a carboxylic acid group, can be varied by the amount of hydroxide reagent. This corresponds to approximately 1.4% conversion of the ester groups to carboxylic acid salt groups.

Example 5

A rotor-stator high shear mixer (Silverson L4RT-A) was fitted with a 4 liter stainless steel beaker. The beaker was charged with 1,000 mL of DI water and 2.8 g of sodium hydroxide. After the dissolution of sodium hydroxide, approximately 50 g of Pigment Yellow 213 (Hostaperm Yellow H5G, manufactured by Clariant Corp.) had been added in one portion. The pigment quickly wetted out, and the mixture was homogenized for 2 hours at 7,200 rpm. Due to shear heat evolution, the temperature of reaction mixture remained at 60 degrees C. The resulting modified organic colorant dispersion was found to have a median particle size of 406 nm.

A stainless steel beaker equipped with a magnetic stir bar was mounted on a stirrer plate and placed into an ice bucket. The beaker was further fitted with a peristaltic pump and a flow-through sonication cell (Misonix 3000) so that a mixture added to the beaker could be cooled, stirred and circulated through the sonication cell simultaneously. To this was added approximately 100 mL of the modified organic colorant dispersion (corresponding to 10 g of solid pigment) and 300 mL of DI water. The mixture was circulated through the flow-through sonication cell for 3 hours. The resulting modified organic colorant dispersion had a median particle size of 330 nm.

The dispersion was diafiltered and concentrated to 11.1% solids using 50 nm diafiltration membrane column. The final particle size of the bright yellow dispersion was 300 nm. The modified organic colorant dispersion was found to have a sodium content (measured by ROSS ion-selective sodium electrode, manufactured by ORION) of 921 ppm (on a solid basis) at pH of 9.2. This dispersion was found to be stable on storage at room temperature and at 70 degrees C. for one week.

This example shows an embodiment of the method of the present invention in which the step of combining the components is done under high shear conditions and is followed by a particle size reduction step in which sonication is used. The resulting modified organic colorant is a yellow pigment comprising an organic species having at least one sodium salt of a carboxylic acid group, as shown by the level of sodium. This corresponds to approximately 1.1% conversion of the ester groups to carboxylic acid salt groups.

Comparative Example 1

A stainless steel beaker with a magnetic stir bar was mounted on a stirrer-hot plate, and was further fitted with a peristaltic pump and a flow-through sonication cell (Misonix 3000) so that a mixture added to the beaker could be heated, stirred and circulated through the sonication cell simultaneously. To this was added a mixture of 3 g of Pigment Yellow 155 (InkJet Yellow 4G, manufactured by Clariant Corp.) and 200 mL DI water. The mixture was circulated through the flow-through sonication cell at 60–70 degrees C. for 45 minutes. The resulting organic colorant dispersion was found to have a median particle size of 255 nm. However, this was found to have only limited stability. The dispersion separated on storage, and, in particular, at elevated temperatures (in an oven at 70 degrees C. overnight) under which the dispersions of Examples 1–4 were stable. Additional sonication did not reduce the particle size any further and also did not improve the stability.

As illustrated above, the method of the present invention produces a modified organic colorant and dispersion thereof having improved overall properties. The colorant and dispersions may be particularly useful in inkjet ink compositions to prepare prints and images having excellent print quality and optical density.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of preparing a modified organic colorant dispersion comprising the steps of:
    a) combining, in any order, i) an organic colorant comprising at least one organic species having at least one ester group; ii) an hydroxide reagent; and iii) an aqueous medium, wherein the hydroxide reagent and the organic colorant react to form a modified organic colorant dispersion; and
    b) reducing the particle size of the modified organic colorant in the dispersion to a particle size of less than or equal to 350 nm.

2. A method of preparing a modified organic colorant dispersion comprising the steps of:
    a) reducing the particle size of an organic colorant comprising at least one organic species having at least one ester group to a particle size of less than or equal to 500 nm; and
    b) combining, in any order, i) the size-reduced organic colorant; ii) an hydroxide reagent; and iii) an aqueous medium, wherein the hydroxide reagent and the size-reduced organic colorant react to form a modified organic colorant dispersion.

3. The method of claim 1, wherein the organic colorant is subjected to high shear mixing conditions prior to step a).

4. The method of claim 3, wherein the high shear mixing conditions occur in a horizontal media mill, vertical media mill, attritor, ball mill, hammer mill, pin disk mill, fluid energy mill, jet mill, fluid jet mill, impingement jet mill, rotor-stator, pelletizer, homogenizer, sonicator, or cavitator.

5. The method of claim 1, wherein the organic colorant, the hydroxide reagent, and the aqueous medium are combined under high shear conditions.

6. The method of claim 5, wherein the high shear mixing conditions occur in a horizontal media mill, vertical media mill, attritor, ball mill, hammer mill, pin disk mill, fluid energy mill, jet mill, fluid jet mill, impingement jet mill, rotor-stator, pelletizer, homogenizer, sonicator, or cavitator.

7. The method of claim 1, wherein steps a) and b) occur simultaneously.

8. The method of claim 1, wherein the particle size of the modified organic colorant is reduced by sonication.

9. The method of claim 1, wherein the organic colorant is a colored pigment.

10. The method of claim 9, wherein the colored pigment comprises a blue pigment, a black pigment, a brown pigment, a cyan pigment, a green pigment, a white pigment, a violet pigment, a magenta pigment, a red pigment, an orange pigment, a yellow pigment, or mixtures thereof.

11. The method of claim 9, wherein the colored pigment is selected from the group consisting of: anthraquinones, phthalocyanine blues, phthalocyanine greens, diazos, monoazos, pyranthrones, perylenes, heterocyclic yellows, quinacridones, and (thio)indigoids.

12. The method of claim 1, wherein the hydroxide reagent is sodium hydroxide, potassium hydroxide, lithium hydroxide, ammonium hydroxide, or mixtures thereof.

13. The method of claim 1, wherein the aqueous medium is water.

14. The method of claim 1, wherein the particle size of the modified organic colorant in the dispersion is less than or equal to 300 nm.

15. The method of claim 1, wherein the particle size of the modified organic colorant in the dispersion is less than or equal to 200 nm.

16. The method of claim 1, further comprising the step of drying the modified organic colorant dispersion to form a modified organic colorant in dry form.

17. A modified organic colorant comprising the reaction product of a) an organic colorant comprising at least one organic species having at least one ester group, and b) an hydroxide reagent.

18. The modified organic colorant of claim 17, wherein the modified organic colorant comprises i) at least one organic species having at least one salt of a carboxylic acid group and ii) at least one organic species having at least one ester group.

19. The modified organic colorant of claim 17, wherein the organic colorant comprises at least one organic species having at least two ester groups and wherein the modified organic colorant comprises i) at least one organic species having at least one salt of a carboxylic acid group, ii) at least one organic species having at least two ester groups, and iii) at least one organic species having at least one ester group and a least one salt of a carboxylic acid group.

20. The modified organic colorant of claim 19, wherein:
the organic species having at least one salt of a carboxylic acid group of the modified organic colorant is in an amount X;
the organic species having at least two ester groups of the modified organic colorant is in an amount Y;
the organic species having at least one ester group and at least one salt of a carboxylic acid group of the modified organic colorant is in an amount A; and
the organic species having at least two ester groups of the organic colorant is in an amount Z, and wherein $X+Y+A=Z$.

21. The modified organic colorant of claim 20, wherein $(X+A)=Z$.

22. The modified organic colorant of claim 20, wherein $(X+A)<(0.5)\times Z$.

23. The modified organic colorant of claim 20, wherein $(X+A)<(0.1)\times Z$.

24. The modified organic colorant of claim 20, wherein $(X+A)<(0.02)\times Z$.

25. The modified organic colorant of claim 20, wherein $X<Y$.

26. The modified organic colorant of claim 18, wherein the organic species having at least one salt of a carboxylic acid group is at the surface of the modified organic colorant.

27. The modified organic colorant of claim 17, wherein the organic colorant is a colored pigment.

28. The modified organic colorant of claim 27, wherein the colored pigment comprises a blue pigment, a black pigment, a brown pigment, a cyan pigment, a green pigment, a white pigment, a violet pigment, a magenta pigment, a red pigment, an orange pigment, a yellow pigment, or mixtures thereof.

29. The modified organic colorant of claim 27, wherein the colored pigment is selected from the group consisting of: anthraquinones, phthalocyanine blues, phthalocyanine greens, diazos, monoazos, pyranthrones, perylenes, heterocyclic yellows, quinacridones, and (thio)indigoids.

30. The modified organic colorant of claim 17, wherein the modified organic colorant is in dispersion form.

31. An inkjet ink composition comprising a liquid vehicle and a modified organic colorant comprising the reaction product of a) an organic colorant comprising at least one organic species having at least one ester group and b) a hydroxide reagent.

32. The inkjet ink composition of claim 31, wherein the modified organic colorant comprises i) at least one organic species having at least one salt of a carboxylic acid group and ii) at least one organic species having at least one ester group.

33. The inkjet ink composition of claim 31, wherein the organic colorant comprises at least one organic species having at least two ester groups and wherein the modified organic colorant comprises i) at least one organic species having at least one salt of a carboxylic acid group, ii) at least one organic species having at least two ester groups, and iii) at least one organic species having at least one ester group and a least one salt of a carboxylic acid group.

34. The inkjet ink composition of claim 31, wherein the liquid vehicle is an aqueous vehicle.

* * * * *